(12) United States Patent
Uehara

(10) Patent No.: US 9,959,853 B2
(45) Date of Patent: *May 1, 2018

(54) RECORDING METHOD AND RECORDING DEVICE THAT USES MULTIPLE WAVEFORM SIGNAL SOURCES TO RECORD A MUSICAL INSTRUMENT

(71) Applicant: YAMAHA CORPORATION, Hamamatsu-shi, Shizuoka (JP)

(72) Inventor: Haruki Uehara, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/110,828

(22) PCT Filed: Jan. 6, 2015

(86) PCT No.: PCT/JP2015/050175
§ 371 (c)(1),
(2) Date: Jul. 11, 2016

(87) PCT Pub. No.: WO2015/107941
PCT Pub. Date: Jul. 23, 2015

(65) Prior Publication Data
US 2016/0329036 A1    Nov. 10, 2016

(30) Foreign Application Priority Data

Jan. 14, 2014 (JP) .................... 2014-004369

(51) Int. Cl.
*G10H 1/00* (2006.01)
*G10H 3/00* (2006.01)
(Continued)

(52) U.S. Cl.
CPC ............... *G10H 1/361* (2013.01); *G10F 1/02* (2013.01); *G10H 1/00* (2013.01); *G10H 1/0066* (2013.01);
(Continued)

(58) Field of Classification Search
CPC .................... G10H 1/00; G10H 3/00
(Continued)

(56) References Cited

U.S. PATENT DOCUMENTS 5,140,637 A * 8/1992 McCarthy ............... H04S 1/00
381/1
6,038,324 A * 3/2000 Ambourn .............. H04R 5/02
381/18

(Continued)

FOREIGN PATENT DOCUMENTS

JP    2001195058 A    7/2001
JP    2005084578 A    3/2005
(Continued)

OTHER PUBLICATIONS

International Search Report issued in International Application No. PCT/JP2015/050175, mailed Mar. 31, 2015. English translation provided.

(Continued)

*Primary Examiner* — David Warren
(74) *Attorney, Agent, or Firm* — Rossi, Kimms & McDowell LLP

(57) ABSTRACT

A recording method acquires, from a first musical instrument which outputs playing data which represents playing information, playing data of playing by the first musical instrument; generates a first waveform signal according to the played sounds of the first musical instrument which correspond to the playing data; generates a second waveform signal according to a sound including a sound emitted (Continued)

from the first musical instrument and other sounds; generates a third waveform signal wherein the first waveform signal is subtracted from the second waveform signal; generates audio data from the third waveform signal; and records the audio data.

15 Claims, 2 Drawing Sheets

(51) Int. Cl.
*G10H 1/36* (2006.01)
*H04R 3/00* (2006.01)
*G10F 1/02* (2006.01)
*G11B 20/10* (2006.01)

(52) U.S. Cl.
CPC ......... *G10H 3/00* (2013.01); *G11B 20/10527* (2013.01); *H04R 3/00* (2013.01); *G10H 2240/325* (2013.01); *G11B 2020/10546* (2013.01); *H04S 2400/15* (2013.01)

(58) Field of Classification Search
USPC .......................................... 84/600–602, 723
See application file for complete search history.

(56) References Cited

U.S. PATENT DOCUMENTS

| | | | | |
|---|---|---|---|---|
| 6,148,086 | A * | 11/2000 | Ciullo | G10H 1/366 381/106 |
| 6,690,799 | B1 * | 2/2004 | Iwase | H04S 1/00 381/1 |
| 7,081,580 | B2 * | 7/2006 | Brinkman | G06Q 20/00 84/609 |
| 7,129,408 | B2 | 10/2006 | Uehara | |
| 7,672,466 | B2 * | 3/2010 | Yamada | G10H 1/361 379/406.01 |
| 7,986,796 | B2 * | 7/2011 | Kim | G10L 19/008 381/98 |
| 8,138,409 | B2 * | 3/2012 | Brennan | G09B 5/00 434/307 A |
| 8,295,494 | B2 * | 10/2012 | Oh | H04S 3/008 361/119 |
| 8,346,311 | B2 * | 1/2013 | Tachibana | H04M 9/082 455/570 |
| 8,358,906 | B2 | 1/2013 | Takai et al. | |
| 8,541,676 | B1 * | 9/2013 | Waldman | G10H 1/0008 84/603 |
| 8,572,487 | B2 * | 10/2013 | Rich | G11B 27/322 715/704 |
| 8,957,297 | B2 * | 2/2015 | Urry | G10H 1/06 84/721 |
| 9,071,900 | B2 * | 6/2015 | Vesa | H04R 5/027 |
| 9,230,552 | B2 * | 1/2016 | Soroka | G11B 27/105 |
| 9,372,251 | B2 * | 6/2016 | Soulodre | G01S 3/8006 |
| 9,373,320 | B1 * | 6/2016 | Lyon | G10L 21/02 |
| 9,524,707 | B2 * | 12/2016 | Urry | G10H 1/348 |
| 2002/0120675 | A1 | 8/2002 | Everett et al. | |
| 2003/0094091 | A1 * | 5/2003 | Brinkman | G06Q 20/00 84/609 |
| 2003/0094092 | A1 * | 5/2003 | Brinkman | G06Q 20/00 84/609 |
| 2003/0115349 | A1 * | 6/2003 | Brinkman | G06Q 20/00 709/231 |
| 2003/0164084 | A1 | 9/2003 | Redmann et al. | |
| 2004/0044804 | A1 * | 3/2004 | Mac Farlane | G06F 3/162 710/1 |
| 2004/0044805 | A1 * | 3/2004 | Mac Farlane | G06F 3/162 710/1 |
| 2004/0177744 | A1 * | 9/2004 | Strasser | G09B 19/00 84/470 R |
| 2005/0120866 | A1 * | 6/2005 | Brinkman | G06Q 20/00 84/609 |
| 2005/0150362 | A1 | 7/2005 | Uehara | |
| 2006/0112814 | A1 | 6/2006 | Paepcke | |
| 2006/0182291 | A1 | 8/2006 | Kunieda et al. | |
| 2007/0147623 | A1 * | 6/2007 | Kim | G10L 19/008 381/19 |
| 2007/0147638 | A1 * | 6/2007 | Moon | H04R 3/04 381/98 |
| 2008/0049943 | A1 * | 2/2008 | Faller | G10L 19/008 381/17 |
| 2008/0075292 | A1 * | 3/2008 | Wong | G10H 1/20 381/61 |
| 2008/0163747 | A1 | 7/2008 | Uehara et al. | |
| 2008/0184870 | A1 * | 8/2008 | Toivola | G10H 1/365 84/610 |
| 2008/0245215 | A1 | 10/2008 | Kobayashi | |
| 2009/0038467 | A1 | 2/2009 | Brennan | |
| 2009/0038468 | A1 * | 2/2009 | Brennan | G09B 5/06 84/609 |
| 2009/0064851 | A1 | 3/2009 | Morris | |
| 2009/0067634 | A1 * | 3/2009 | Oh | H04S 3/008 381/17 |
| 2009/0178533 | A1 | 7/2009 | Koseki et al. | |
| 2010/0089223 | A1 * | 4/2010 | Ting | G10H 1/361 84/610 |
| 2010/0299151 | A1 * | 11/2010 | Soroka | G11B 27/105 704/500 |
| 2011/0146476 | A1 | 6/2011 | Zimmerman | |
| 2012/0063617 | A1 * | 3/2012 | Ramos | G11B 20/00826 381/119 |
| 2012/0253827 | A1 * | 10/2012 | Soroka | G11B 27/105 704/500 |
| 2012/0300941 | A1 * | 11/2012 | Shim | H04R 5/04 381/1 |
| 2013/0065213 | A1 * | 3/2013 | Gao | G10H 1/365 434/307 A |
| 2013/0294606 | A1 * | 11/2013 | Soroka | G11B 27/105 381/22 |
| 2013/0327201 | A1 * | 12/2013 | Urry | G10H 1/06 84/626 |
| 2015/0154948 | A1 * | 6/2015 | Urry | G10H 1/06 84/626 |
| 2015/0278686 | A1 * | 10/2015 | Cardinaux | G06F 3/165 706/22 |
| 2015/0302758 | A1 | 10/2015 | Tunogai | |
| 2016/0139775 | A1 * | 5/2016 | Segal | G06F 3/04842 715/716 |
| 2016/0360019 | A1 * | 12/2016 | Ellis | H04M 1/6091 |
| 2016/0379514 | A1 | 12/2016 | Matahira et al. | |

FOREIGN PATENT DOCUMENTS

| | | |
|---|---|---|
| JP | 2007256879 A | 10/2007 |
| JP | 2008172409 A | 7/2008 |
| JP | 2009168911 A | 7/2009 |
| RU | 2189119 C2 | 9/2002 |
| RU | 2007114585 A | 10/2008 |
| WO | 2005111997 A1 | 11/2005 |

OTHER PUBLICATIONS

Written Opinion issued in International Application No. PCT/JP2015/050175, mailed Mar. 31, 2015.

International Search Report issued in Intl. Appln. No. PCT/JP2015/050115 dated Mar. 31, 2015. English translation provided. Cited in U.S. Publication 4.

Written Opinion issued in Intl. Appln. No. PCT/JP2015/050115 dated Mar. 31, 2015. Cited in U.S. Publication 4.

Office Action issued in U.S. Appl. No. 15/039,466 dated Apr. 12, 2017.

Notice of Allowance issued in U.S. Appl. No. 15/039,466 dated Sep. 7, 2017.

Extended European Search Report issued in European Appln. No. 15735419.2 dated Jun. 19, 2017.

Office Action issued in Russian Application No. 2016127416 dated Sep. 19, 2017. English translation provided.

(56) References Cited

OTHER PUBLICATIONS

Office Action issued in Japanese Application No. 2014-003695 dated Oct. 31, 2017. English translation provided.
Notice of Allowance issued in U.S. Appl. No. 15/039,466 dated Jan. 18, 2018.
Office Action issued in Japanese Application No. 2014-004369 dated Jan. 9, 2018. English translation provided.

* cited by examiner

RECORDING METHOD AND RECORDING DEVICE THAT USES MULTIPLE WAVEFORM SIGNAL SOURCES TO RECORD A MUSICAL INSTRUMENT

TECHNICAL FIELD

The present invention relates to a recording method of a musical instrument. Priority is claimed on Japanese Patent Application No. 2014-4369, filed Jan. 14, 2014, the content of which is incorporated herein by reference.

BACKGROUND ART

Generally, a player piano can output a musical performance that a user has performed using a player piano as musical-performance information in the MIDI (Musical Instrument Digital Interface) format. Also, the player piano can perform automatic playing by reading in MIDI-format musical-performance information, and based on this musical-performance information, controlling a solenoid for key driving and generating piano sounds by string striking.

In Patent Document 1, a person for example sings a song while listing to a performance by a player piano, and the voice from that singing is converted to audio data. A technique is disclosed for recording this audio data paired with musical-performance information in the MIDI format outputted by the player piano as integrated musical-performance data. Also, Patent Document 1 discloses a technique for a player piano to simultaneously reproduce the piano performance and the voice according to the singing by reading in the integrated musical-performance data. In this synchronized reproduction technique, the player piano is able to perform automatic playing in accordance with the musical-performance information in the MIDI format contained in the integrated musical-performance data, while a reproduction device built into the player piano reproduces, in time with the piano playing, the audio data included in the integrated musical-performance data.

If this technique is used, played sounds resulting from for example a player piano and an orchestra playing simultaneously are picked up and recorded as integrated musical-performance data. That integrated musical-performance data is reproduced by being read into player pianos installed for example in homes and the like. Thereby, users can appreciate the playing of the player piano and orchestra.

PRIOR ART DOCUMENTS

Patent Document

[Patent Document 1] Japanese Unexamined Patent Application, First Publication No. 2009-168911

DISCLOSURE OF THE INVENTION

Problems to be Solved by the Invention

However, when the played sounds from a player piano and an orchestra are picked up by a microphone, the played sounds due to the player piano and the played sounds by other musical instruments come to be included in the picked-up played sounds. The integrated musical-performance data based on these picked-up played sounds are synchronously reproduced by the player piano. In this case, the problem arises of the played sounds reproduced based on the MIDI-format musical-performance information and the played sounds of a piano contained in the reproduced sounds of the audio data audibly overlapping.

The present invention was achieved in view of the aforementioned circumstances and has as its purpose, when picking up and recording both played sounds of a player piano and played sounds by other musical instruments or sounds by singing, to prevent the played sounds of the player piano from mixing in with the played sounds by the other musical instruments, and as a result, the played sounds of the player piano from being doubly emitted during reproduction of the integrated musical-performance data that is recorded.

Means for Solving the Problems

In order to solve the aforementioned problem, the present invention provides a recording method comprising: acquiring, from a first musical instrument that outputs musical-performance data representing musical-performance information, musical-performance data of playing by the first musical instrument; generating a first waveform signal according to the played sounds of the first musical instrument corresponding to the musical-performance data; generating a second waveform signal according to sounds including sounds produced from the first musical instrument and other sounds; generating a third waveform signal in which the first waveform signal is removed from the second waveform signal; generating audio data from the third waveform signal; and recording the audio data.

Effects of the Invention

According to the present invention, when simultaneously picking up and recording played sounds by a player piano and other musical instruments and the like, it is possible to prevent the played sounds by the player piano from mixing in with audio data in which is recorded the played sounds by other instruments and the like.

EMBODIMENTS FOR CARRYING OUT THE INVENTION

Hereinbelow, a recording method in the first embodiment of the present invention will be described referring to FIG. 1 and FIG. 2.

First, the invention according to the present embodiment is an invention relating to a recording method in the following situation.

Figure 1:
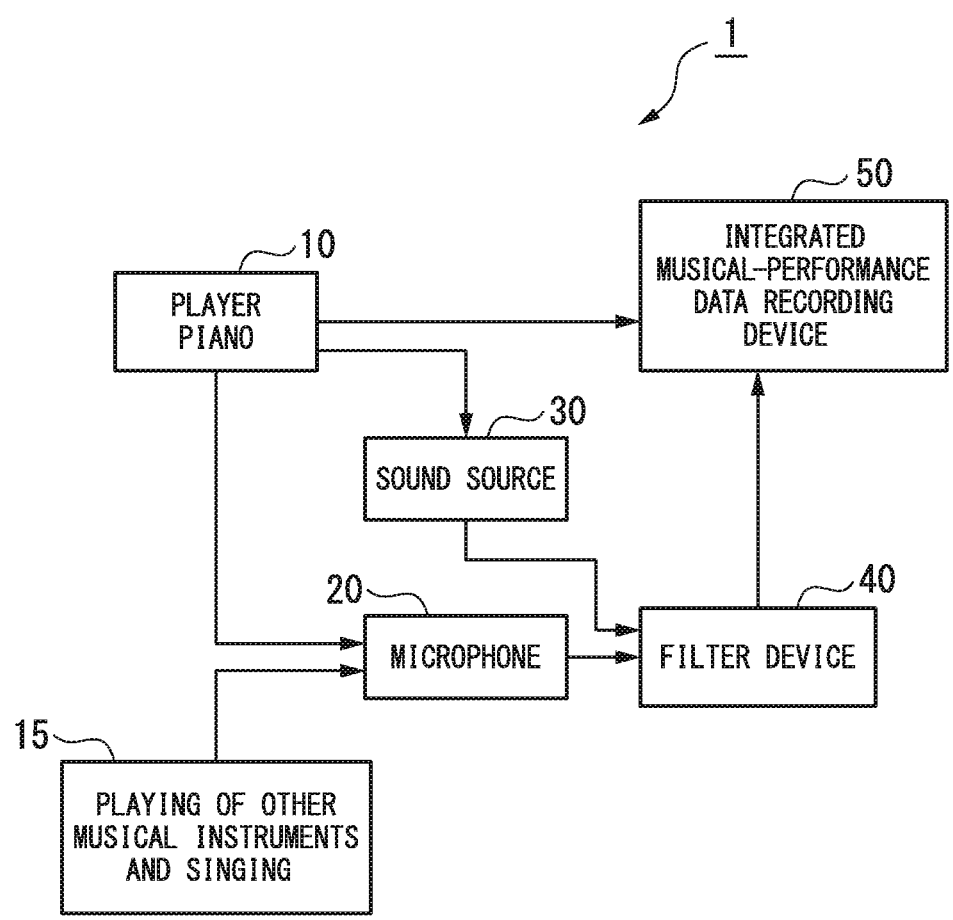
FIG. 1 is a block diagram showing the recording system in the first embodiment of the present invention.

FIG. 1 is a function block diagram showing the constitution of a recording system. The recording system 1 of the present embodiment shown in FIG. 1 is provided with a player piano 10, a microphone 20, a sound source 30, a filter device 40, and an integrated musical-performance data recording device 50.

The player piano 10 has a function that outputs musical-performance information describing the content that a user has performed using the player piano 10 as musical-performance data in the MIDI format. Note that in the following description, MIDI is described as an example of one aspect of the musical-performance data. The data of the MIDI format is sequence data, and this MIDI-format sequence data is hereinbelow called the MIDI data.

The player piano 10 has a function that reads in MIDI data and reproduces the playing indicated by the MIDI data by causing the keys to operate in accordance with the timbre and sound pitch, sound production and stoppage timing contained in the MIDI data. Since methods of outputting the playing of a player piano 10 by MIDI data as well as methods of driving keys and producing piano sounds by reading in MIDI data are publicly known, detailed descriptions thereof will be omitted.

Also, the player piano 10 has built in a reproduction device that reproduces audio data. Audio data is data in which a waveform signal corresponding to played sounds of a musical instrument and the like are digitized.

The player piano 10, by reading in the integrated musical-performance data that pairs MIDI data and audio data, plays automatically based on the MIDI data and reproduces the sounds based on the audio data by the reproduction device. Thereby, the player piano 10 can reproduce in synchronization the sounds according to the MIDI data and the audio data.

It is possible to use integrated musical-performance data generated by the method disclosed for example in Patent Document 1 for the integrated musical-performance data that pairs this MIDI data and the audio data. When this function is used, for example the following things are possible. The user plays the player piano 10, and an orchestra performs playing of other musical instruments in time with the playing of the player piano 10. At that time, the player piano 10 outputs musical-performance information as MIDI data. The playing by the other musical instruments is picked up by a microphone, and recorded by a recording device as audio data. The recording device integrates the MIDI data and audio data by a predetermined method to generate integrated musical-performance data that can be synchronously reproduced by the player piano 10. Thereby, an enthusiast or the like who owns the player piano 10 can obtain that integrated musical-performance data and using the reproduction device built into the player piano 10 can appreciate reproducing the performance of the orchestra.

The microphone 20 (first sound pick-up device) is a sound pick-up means that picks up the playing of other musical instruments (ensemble) or sounds by singing 15. The microphone 20 may be provided with its directionality and placement location configured so as to not pick up other sounds not related to the playing. However, in the case of the player piano 10 and other musical instruments such as of an orchestra giving a joint performance, even if such measures are taken, the microphone 20 ends up picking up not only the sounds from playing by other musical instruments and singing 15 but also the played sounds by the player piano 10.

The situation will be considered of converting these played sounds picked up by the microphone 20 to audio data, paring it with the MIDI data output by the player piano 10 and recording them as integrated musical-performance data, and moreover synchronously reproducing this integrated musical-performance data by the player piano 10. At this time, the played sounds of the player piano 10 based on the MIDI data and the piano playing sounds of the player piano 10 picked up by the microphone 20 are included in the sounds that are synchronously reproduced. The user feels discomfort due to the piano playing sound audibly overlapping doubly. Therefore, in the present embodiment, a solution to this problem is devised by removing the played sounds by the player piano 10 from the sounds picked up by the microphone 20 using the following device.

A sound source 30 is a sound source module that, by reading in MIDI data, generates a waveform signal of sounds played by the player piano 10 from information such as timbre, pitch, sound production and stoppage timing contained in the MIDI data. The sound source 30 generates a waveform signal corresponding to the MIDI data output by the player piano 10 and outputs it to a filter device 40. In the first embodiment, the sound source 30 performs generation of a first waveform signal according to the played sounds of the first musical instrument corresponding to the musical-performance data, based on the MIDI data (musical-performance data) that the player piano 10 has output.

The filter device 40 is a filter for cancelling the sounds of the piano. The filter device 40 eliminates the sounds of the player piano 10 (cancels the piano sounds) from the sounds picked up by the microphone 20 by removing the waveform signal of the played sounds by the player piano 10 from the waveform signal of sounds in which the played sounds of the player piano 10 and the sounds from playing of other musical instruments and singing 15 picked up by the microphone 20 are mixed. The filter device 40 generates audio data from the waveform signal after the piano sound cancellation.

The integrated musical-performance data recording device 50 is a recording device for generating and recording integrated musical-performance data that pairs MIDI data and audio data. The integrated musical-performance data recording device 50 may record in one file both the MIDI data corresponding to the played sounds of the player piano 10 and the audio data corresponding to the sounds from playing of other musical instruments and singing 15 after the piano sounds are cancelled. Also, the integrated musical-performance data recording device 50 may record data in which an encoding process is applied to the MIDI data in for example the first channel of stereo data, and records the audio data in the second channel, and saves it as one file.

Figure 2:
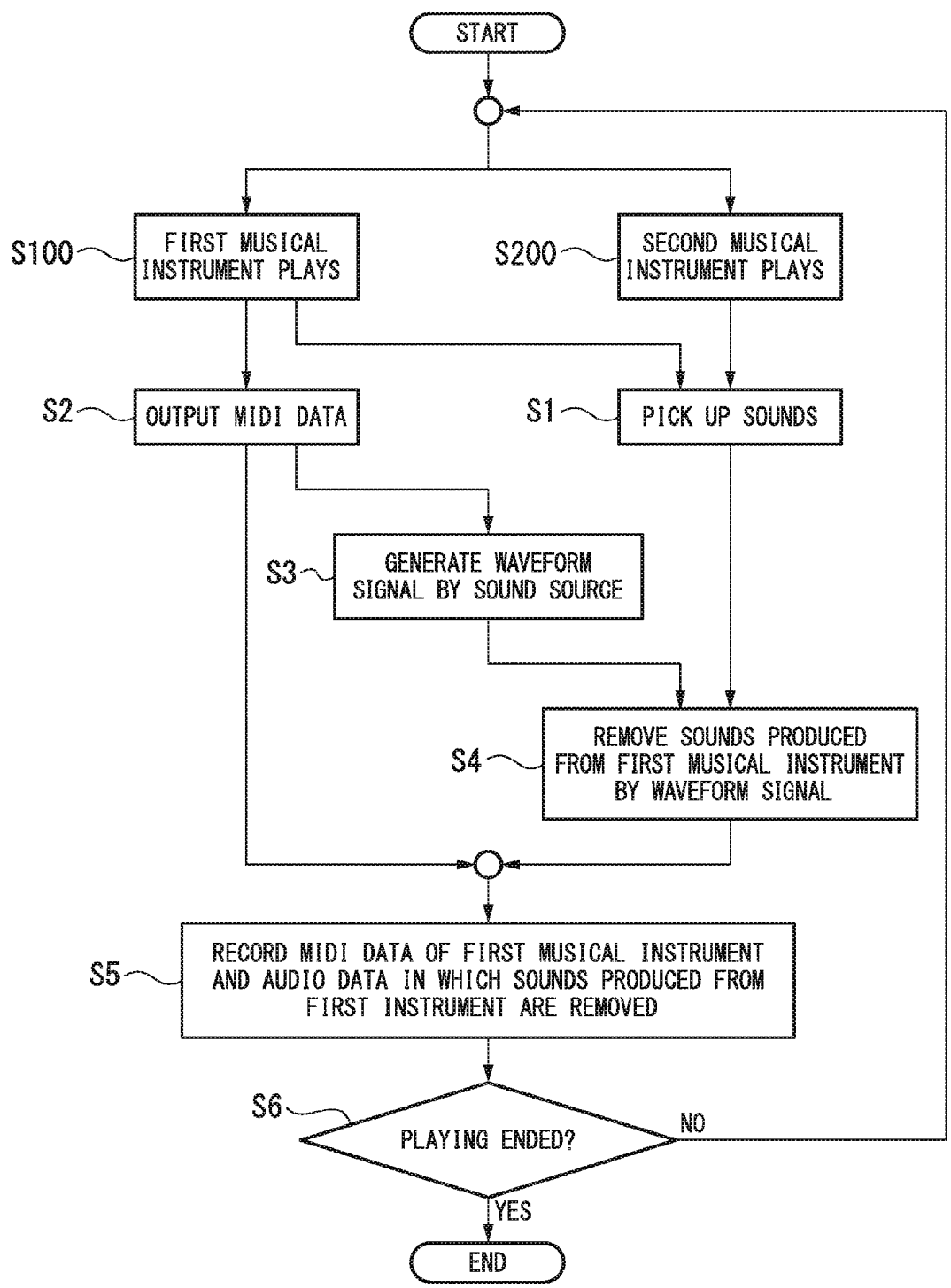
FIG. 2 is a flowchart showing the recording method using the recording system in the first embodiment of the present invention.

FIG. 2 is a flowchart of the recording method using a recording system in the first embodiment of the present invention.

Referring to FIG. 2, the recording method in the present embodiment will be described.

As an example, the situation will be considered in which a player piano (first musical instrument) and another musical instrument (second musical instrument) perform simultaneously, with the played sounds by the player piano and the played sounds by the other musical instrument being recorded in integrated musical-performance data.

It is presumed that the player piano 10 emits sounds by a playing operation of the player piano 10 by the user or the automatic playing function that the player piano 10 is provided with (Step S100).

Simultaneously, another musical instrument shall emit sound by a playing operation of another user (Step S200).

First, the microphone 20 picks up sounds in which the played sounds from the player piano 10 and the played sounds from the other musical instrument are mixed (Step S1). Since MIDI data is not obtained from the other musical instrument, in order to record the audio data, the played sounds are picked up by the microphone 20. While it would be good if the microphone 20 at this time were able to only pick up the played sounds from the other musical instrument, in reality it ends up also picking up the played sounds that the player piano 10 makes. The microphone 20 converts the picked up sounds to a waveform signal (second waveform signal) and outputs it to the filter device 40.

In parallel with the microphone 20 picking up the played sounds of the other musical instrument, the player piano 10 generates MIDI data in accordance with its playing and outputs it to the sound source 30 (Step S2).

The player piano 10 outputs the generated MIDI data to the integrated musical-performance data recording device 50.

The sound source 30, on the basis of the MIDI data acquired from the player piano 10, generates a waveform signal (first waveform signal) and outputs it to the filter device 40 (Step S3).

The filter device 40 generates a new waveform signal (third waveform signal) by removing the waveform signal representing the played sounds by the player piano 10 acquired from the sound source 3 from the waveform signal acquired from the microphone 20 (Step S4). Removing the waveform signal of the player piano 10 may be carried out for example as follows.

The filter device 40 generates a waveform signal having a waveform in opposite phase from the waveform signal representing the played sounds by the player piano 10 acquired from the sound source 30. This waveform signal in opposite phase is a signal for cancelling the piano sounds. Then, the filter device 40 analyzes the component of sounds by the player piano 10 included in the waveform signal acquired from the microphone 20, and makes adjustments to the amplitude and phase of the waveform signal in opposite phase. Next, the filter device 40 generates a new waveform signal in which the piano sounds are cancelled (third waveform signal) by combining this adjusted waveform signal and the waveform signal acquired from the microphone 20. This generated waveform signal is a signal representing the played sounds from the other musical instruments in which the played sounds by the player piano 10 have been removed. Next, the filter device 40 converts this waveform signal to audio data of for example the RIFF (Resource Interchange File Format) and outputs this audio data to the integrated musical-performance data recording device 50.

The integrated musical-performance data recording device 50 records the MIDI data and the audio data paired in one file (Step S5).

Finally, the player piano 10 determines whether or not the playing has ended by an end request operation from the user (Step S6), and if the playing has not ended, repeats the process from Step S1. If the playing has ended, the process flow ends.

According to the present embodiment, using the waveform signal generated on the basis of the MIDI data output by the player piano 10, it is possible to record sounds in which the played sounds by the player piano 10 are removed from the waveform signal in which the played sounds by musical instruments other than the player piano 10 and singing and the played sounds by the player piano 10 are mixed.

Other Embodiments

In the recording system according to the first embodiment, the description was given using a method that generates a waveform signal for cancelling piano sounds from MIDI data output by the player piano 10 in the filter device 40. However, the following type of embodiment is also possible.

That is, vibration of strings of the piano are detected by piezoelectric devices (piezo sensors) provided at bridges of the soundboard instead of MIDI data. Based on the detected vibration information of the strings, a waveform signal that represents the played sounds by the player piano 10 may be generated and output to the filter device 40. Similarly, using an acceleration sensor the acceleration of the vibration of the soundboard of the piano may be detected, and by calculating the displacement of the soundboard and sound pressure, a waveform signal that describes the piano played sounds may be generated and output to the filter device 40. In this embodiment, the generation of the first waveform signal according to the played sounds of the first musical instrument corresponding to the musical-performance data may be performed based on a signal detected by for example a piezoelectric sensor, an acceleration sensor and the like.

Also, a microphone may be provided in the vicinity of the soundboard of the player piano 10, and the waveform signal of the played sounds emitted from the soundboard and picked up by the microphone may be output to the filter device 40.

In addition, it is possible where appropriate to replace the constituent elements of the embodiment described above with well-known constituent elements in a range that does not depart from the gist of the present invention. Also, the technical scope of this invention is not limited to the embodiment described above, and it is possible to make various modifications in a range that does not depart from the gist of the present invention. For example, provided it is capable of output and playback of MIDI data, the player piano may be another electronic instrument. Also, the player piano 10, the sound source 30, the filter device 40, and the integrated musical-performance data recording device 50 may be integrally constituted, or may be separate units. Also, the reproduction device that is built into the player piano 10 may be separate from the player piano 10 and used by being connected with the player piano 10. In addition, in the embodiment described above, the description was given with MIDI-format musical-performance data serving as an example, but the musical-performance data is not limited to the MIDI format. Provided it is sequence data that can be interpreted by the player piano 10 and sound source 30, it may be any kind of data.

Also, in the embodiment described above, the sound source 30 transmitted to the filter device 40 a waveform signal of the piano played sound generated from the MIDI data transmitted from the player piano 10 as the first waveform signal. Instead of this, a microphone for generation of the first waveform signal (second sound pick-up device) may be provided in the vicinity of the player piano 10, and the played sounds of the player piano 10 picked up by this microphone may be transmitted to the filter device 40 as a first waveform signal. It is desirable that this microphone have narrow directionality and have a sound pick-up characteristic specialized for played sounds of the player piano 10. Also, this microphone is arranged at a position that has less of a tendency to pick up the voice uttered by the user.

DESCRIPTION OF THE REFERENCE SYMBOLS

10: Player piano
20: Microphone
30: Sound source
40: Filter device
50: Integrated musical-performance data recording device

The invention claimed is:
1. A recording method comprising:
an acquiring step of acquiring, from a first musical instrument that outputs musical-performance data rep- resenting musical-performance information, the musical-performance data output by the first musical instrument;
a first waveform generating step of generating a first waveform signal corresponding to played sounds of the first musical instrument according to the musical-performance data;
a second waveform generating step of generating a second waveform signal corresponding to sounds, including the played sounds of the first musical instrument according to the musical-performance data and other sounds, picked up by a microphone;
a third waveform generating step of generating a third waveform signal by removing the first waveform signal corresponding to the played sounds of the first musical instrument picked up by the microphone from the second waveform signal;
an audio data generating step of generating audio data from the third waveform signal; and
a recording step of recording the audio data.

2. The recording method according to claim 1, wherein:
the musical-performance data is sequence data, and the recording step records the audio data paired with the musical-performance data from the first musical instrument.

3. The recording method according to claim 1, wherein the musical-performance data is MIDI (Music Instrument Digital Interface) data.

4. The recording method according to claim 1, further comprising a fourth waveform generating step of generating a fourth waveform signal, using a sound source, based on the musical-performance data output by the first musical instrument.

5. The recording method according to claim 1, wherein:
the second waveform generating step generates the second waveform signal by picking up the other sounds, which is produced by a second musical instrument that is different from the first musical instrument, using the microphone, and
the microphone is arranged in the vicinity of the second musical instrument.

6. The recording method according to claim 4, further comprising:
a fifth waveform generating step of generating a fifth waveform signal having a phase opposite of the fourth waveform signal,
wherein the third waveform generating step generates the third waveform signal by combining the second waveform signal and the fifth waveform signal to cancel the first waveform signal corresponding to the played sounds of the first musical instrument picked up by the microphone.

7. The recording method according to claim 1, wherein the other sounds are produced by a second musical instrument that is different from the first musical instrument.

8. A recording device for recording music from a first musical instrument that outputs a first waveform signal corresponding to played sounds of the first musical instrument according to musical-performance data representing musical-performance information, and other sounds other than from the first musical instrument, the recording device comprising:
a recorder that receives the musical-performance data from the first musical instrument;
a microphone that picks up a second waveform signal corresponding to sounds, including the played sounds of the first musical instrument according to the musical-performance data and the other sounds;
a filter device that receives the second waveform signals output from the microphone, and outputs a third waveform signal where the first waveform signal corresponding to the played sounds of the first musical instrument picked up by the microphone is removed from the second waveform signal; and
a recorder that records audio data that is generated from the third waveform signal output by the filter device.

9. The recording device according to claim 8, wherein:
the first musical instrument outputs the musical-performance data as sequence data, and
the recorder records the audio data paired with the musical-performance data.

10. The recording device according to claim 8, wherein the musical-performance data is MIDI (Music Instrument Digital Interface) data.

11. The recording device according to claim 8, further comprising:
a sound source,
wherein the first musical instrument outputs the musical-performance data as sequence data, and
wherein the sound source generates a fourth waveform signal based on the musical-performance data.

12. The recording device according to claim 8, wherein the microphone is arranged to be in the vicinity of a second musical instrument, which generates the other sounds.

13. The recording device according to claim 11, wherein the filter device:
generates a fifth waveform signal having a phase opposite of the fourth waveform signal, and generates and outputs the third waveform signal by combining the second waveform signal and the fifth waveform signal to cancel the first waveform signal corresponding to the played sounds of the first musical instrument picked up by the microphone.

14. The recording device according to claim 8, wherein the other sounds are produced by a second musical instrument that is different from the first musical instrument.

15. A recording method comprising:
an acquiring step of acquiring, from a first musical instrument that outputs musical-performance data representing musical-performance information, the musical-performance data output by the first musical instrument;
a first waveform generating step of generating a first waveform signal corresponding to played sounds of the first musical instrument according to the musical-performance data;
a second waveform generating step of generating a second waveform signal corresponding to sounds including the played sounds of the first musical instrument according to the musical-performance data and other sounds;
a third waveform generating step of generating a third waveform signal by removing the first waveform signal corresponding to the played sounds of the first musical instrument from the second waveform signal;
an audio data generating step of generating audio data from the third waveform signal; and
a recording step of recording the audio data,
wherein the musical-performance data is sequence data, and
wherein the recording step records the audio data paired with the musical-performance data.

* * * * *